July 3, 1962
L. L. JACKSON
3,042,808
PORTABLE A.C.-D.C. WELDER AND POWER SUPPLY
Filed May 23, 1961
3 Sheets-Sheet 1
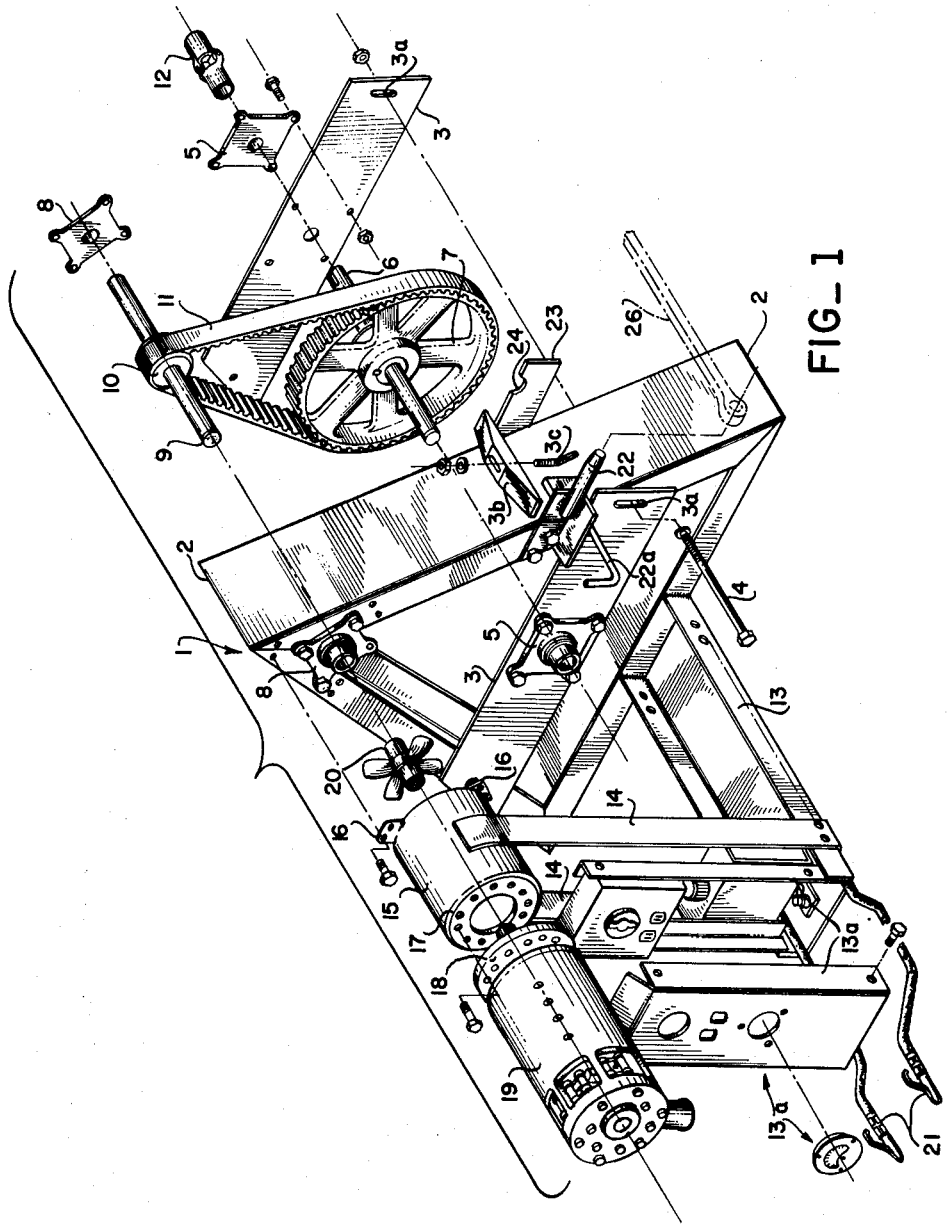
INVENTOR.
LOWELL L. JACKSON
BY Albert L. Carter
Attorney July 3, 1962 L. L. JACKSON 3,042,808
PORTABLE A.C.-D.C. WELDER AND POWER SUPPLY
Filed May 23, 1961 3 Sheets-Sheet 2
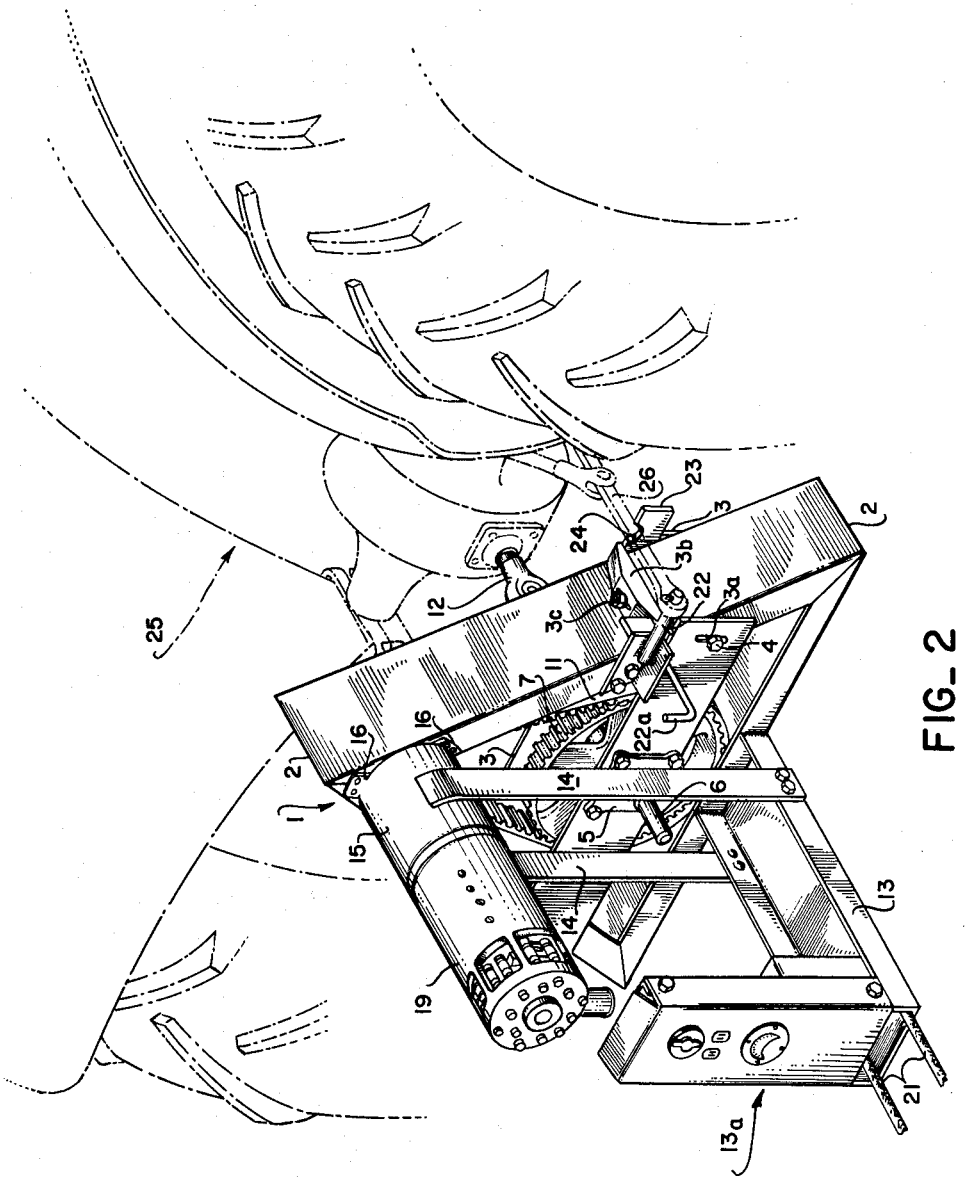
FIG_2
INVENTOR.
LOWELL L. JACKSON
BY Albert L. Carter
Attorney

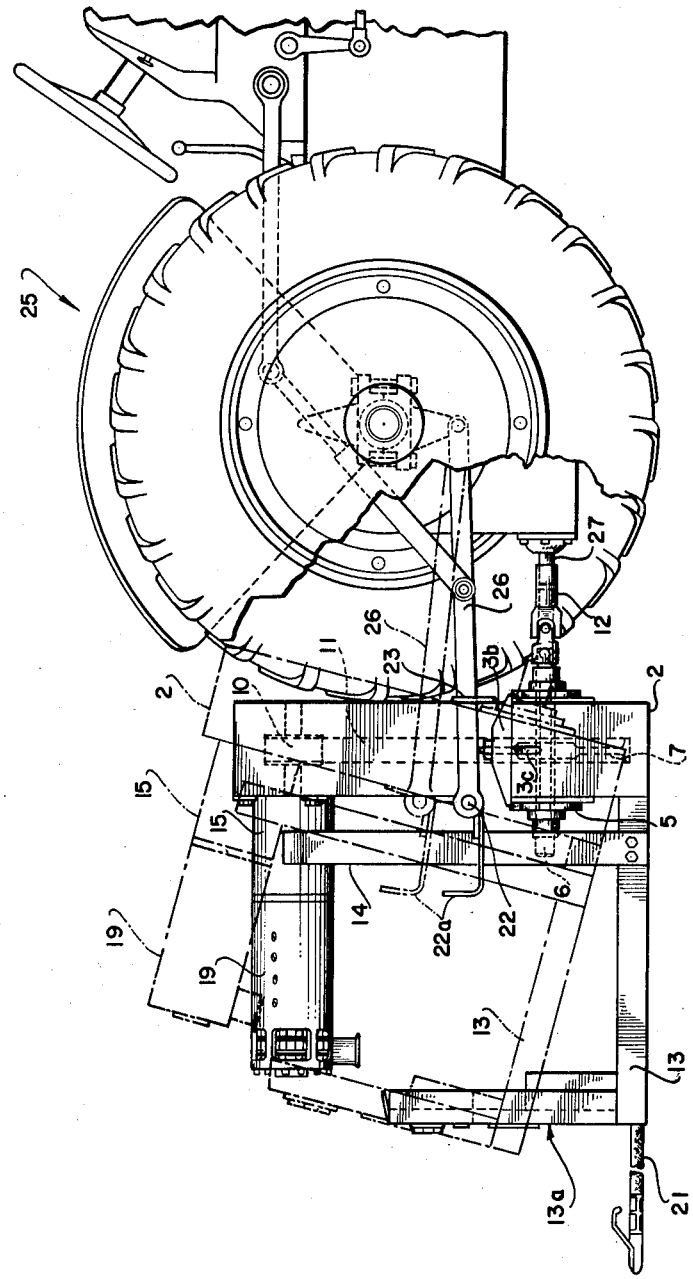

United States Patent Office 3,042,808
Patented July 3, 1962

3,042,808
PORTABLE A.C.-D.C. WELDER AND POWER
SUPPLY
Lowell L. Jackson, 362 Cunningham Road, Marietta, Ga.
Filed May 23, 1961, Ser. No. 111,996
8 Claims. (Cl. 290—1)

This invention relates to a portable electric welder and power supply, and more particularly to a portable electric welder and power supply operated off of a vehicle PTO (power takeoff) and which includes a unique pickup and lifting means whereby the device may be picked up and transported by the vehicle as well as driven by the vehicle to supply electrical power with a minimum expenditure of time and effort.

Various arrangements and devices are known in the prior art which serve the same purpose and function of the present invention. Included are devices that are both expensive and complicated, and which are either built into the vehicle and the vehicle drive on a permanent basis by a vehicle modification, or have a degree of semi-permanency by being mounted on the vehicle and connected into the drive mechanism with allowances made for removal from the vehicle. Those types of vehicle with permanent mounted power supplies result in a substantial investment into the vehicle when only an occasional need for emergency power or welding power is required, such as in the case of farmers, civilian defense organizations, or other organizations concerned with emergency welding and/or emergency power supply. Likewise for those arrangements where the portable supply can be mounted upon a vehicle and connected to a power takeoff, the time may consume up to several hours and require more than one man to mount and remove the unit from the vehicle, depending upon the size of the power supply unit. Such arrangements as these become objectionable in the case of one man operation, such as a farmer desiring to weld a piece of farm equipment at a remote location without necessitating the transporting of the work to a power supply he may have located near the equipment storage location or to wait for a portable power supply to arrive from another source. Likewise in the case of emergency type operations requiring either welding or electrical power, such as accident or catastrophe rescue operations or military field operations where time and manpower may be of an essence.

Accordingly, it is an object of this invention to provide a portable type power supply that can be easily picked up by a vehicle having lifting or pickup arms of standard equipment.

Another object of this invention is to provide a portable type power supply that is easily transportable by a vehicle having standard equipment lifting or pickup arms.

A further object of this invention is to provide a portable power supply that can be both picked up for transportability and/or operation from a vehicle having lifting arms and power takeoff as standard equipment.

Still a further object of this invention is to provide a portable power supply having the features discussed above in which the r.p.m. ratio between the power takeoff and the generator may be varied both substantially as well as minutely.

Another object of this invention is to provide a portable power supply of the type containing the above features which is relatively simple and containing few and inexpensive parts as compared to heretofore known devices.

Other objects and advantages will become apparent from the following description taken in connection with the accompanying drawings in which:

FIGURE 1 is an exploded perspective view of one embodiment of this invention showing the relative relationship between the various parts;

FIGURE 2 shows the embodiment of FIGURE 1 in perspective with the parts in their assembled relation and mounted on a tractor in operative position; and FIGURE 3 shows a side elevation of the invention mounted on a tractor in operative position by the solid lines and in a transportable and non-operating condition in phantomed lines.

Generally stated, the depicted embodiment of this invention comprises an equilateral triangular frame in which is mounted a belt pulley connected to a power driven shaft and a second pulley drivingly connected to an electrical generator, the pulleys connected by a belt. The generator is mounted outside of and connected to the equilateral triangular frame on a stabilizing support extending from the frame. Extending outwardly from two sides of the frame are mounting pins upon which hydraulic lift arms from a vehicle so equipped are connected which permits the placement of the unit into position for connecting to a PTO drive of the vehicle or for lifting the unit off the ground for transport by the vehicle.

Referring more specifically to FIGURES 1 and 2, the power unit assembly 1 comprises an equilateral triangular frame 2 which may be fabricated from three pieces of U channel aluminum or steel welded together. A bearing support member 3 is mounted on each of the vertical sides of frame 2 by appropriate bolt or fastener means passing through openings in the supports 3 and sidewalls of the U channel members of frame 2 extending upwardly. Bearings 5 are mounted on the outer surface of each of the support members 3 in which is located the shaft 6 of a wheel or pulley 7 placed within the triangular frame 2. At the upper corner on each of the vertical sides of frame 2 are mounted bearings 8 to support a shaft 9 on which is a small wheel or pulley 10, likewise mounted within triangular frame 2 the same as pulley 7. Pulleys 7 and 10 are connected together by a belt means 11 whereupon driving rotation of shaft 6 will turn shaft 9, the ratio of relative speeds between shafts 6 and 9 dependent upon the diameters of pulleys 7 and 10. It is to be understood that variation in the speed ratio can be easily accomplished by changing pulleys 7 and/or 10 for those of more appropriate diameters.

While the rims of the pulleys 7 and 10 and the belt 11 are shown as being toothed or ribbed, it is to be understood that this is the preferred form and that actually any type of belt or interconnecting drive may be utilized. Also, by the provision of elongated mounting holes 3a on bearing supports 3 through which pass the bolts 4, means are provided for permitting adjustment of the tightness of belt 11 as the use of the elongated holes will permit the axis of shaft 6 to be moved toward or away from the axis of shaft 9. Such adjustment is accomplished by raising or lowering of a stop or guide means 3b on bolt 3c fastened to the upright leg portion of the triangular frame while the bolts 4 are loose. By use of the stop means 3b when lowering supports 3 to tighten belt 11, the loads on bearings 5 can be kept equalized.

The right hand end of shaft 6 as viewed in FIGURE 1 passes through the right hand support 3 and bearing 5 and has a universal joint 12 mounted thereon, the other end of joint 12 being arranged or adapted to mount onto the power takeoff drive shaft of the vehicle or source of power driving the structure of the present invention.

A stabilizing channel member 13 extends aft from the side of bottom leg of triangular frame 2 and has extending vertically therefrom a pair of strut members 14 which are connected to a fan or blower housing 15. Housing 15 has lugs 16 at one end thereof for mounting onto frame 2 by appropriate bolt or fastener means and on the other end thereof there is provided a mounting flange 17 to mate with the mounting flange 18 of a generator 19. A fan or blower rotor 20 is located within the housing 15 and connects at one end to the drive shaft of generator 19 extending into housing 15, while at the other end it connects to the confronting end of shaft 9 also extending into housing 15 through bearing 8.

The aft end of the stabilizing channel member 13 provides mounting for a housing 13a, which may contain a voltage regulator, rheostat control, indicators, and electrical outlets, etc.; all of which are connected to the generator through any appropriate cable means (not shown). Also extending from housing 13a at the aft end of the stabilizing channel member 13 are a pair of electrical conductors 21 for electric welding. Likewise, any type of protective cowling may be placed about the top of generator 19 and extend down to the sides of stabilizing channel member 13; and if need be, such cowling can be of a good heat dissipating material such as aluminum.

Mounted to the back vertical side of each of the extending legs of frame 2 is a mounting pin arrangement or assembly 22. On the forward side of the same leg members of frame 2 is mounted a support bar 23 having a cutout 24 on the upper edge thereof. Pins 22 and bars 23 are utilized to permit carrying of the entire power unit assembly by any vehicle 25, as can best be seen in FIGURE 2, having a pair of arm lifts 26 which slip over pins 22 and can be locked on in any way such as lockpins, cotter pins, etc. By providing the location of the pins to be slightly forward of the center of gravity of the power unit assembly 1, the aft end of the assembly will tend to swing down due to gravity. Such swinging is limited by the support bars 23 swinging upwardly around the axis of pins 22 so that the cutout 24 engages against the lift arms 26. In this manner raising of the arm lifts 26 will swing the entire power unit assembly 1 upwardly around the pivot connection between arms 26 and the tractor or vehicle 25, and with the arm lifts 26 recessed in the cutout 24 the need for stabilizing sway bars or braces is reduced. A handle 22a extends from the supports of pins 22 to assist in holding or swinging the assembly 1 relative to the axis of pins 22 as well as to provide a place to hang the various electrical cords or cables.

Referring now to FIGURE 3, the power unit assembly 1 is shown in solid lines connected directly to the power takeoff shaft 27 of a tractor 25. By use of universal joint 12, misalignments between the power takeoff shaft 27 and shaft 6 of the unit assembly can be tolerated. The position of the power unit assembly 1 as shown by the phantom lines represents the position of the unit when mounted on the tractor 25 and in a raised position permitting easy transportation or movement of the unit by tractor 25. Also, it is to be noted that in this position the universal joint 12 is disconnected from the PTO shaft 27. Because of this, there are capabilities presented in the assembly as shown for having a high speed or automatic cutoff of driving power to the power unit assembly, which occurs simply by raising the lift arms 26 to pivot the assembly 1 around pivot 26a thereby disconnecting universal joint 12 and PTO shaft 27.

Thus, it can be seen with the above arrangement, I provide an easily portable and connectable power supply or welder for use in conjunction with vehicles having a power takeoff drive shaft and arm lifts; such unit being of a relatively simple and inexpensive construction.

While a particular embodiment of the invention has been shown and described, it will be obvious to those skilled in the art that various changes and modifications may be made without departing from the invention and it is intended to cover in the appended claims all such modifications and equivalents as fall within the true spirit and scope of this invention.

What is claimed is:
1. A portable welding and electric power generating assembly comprising: a triangular frame, a generator mounted to extend axially from one side of said frame, a first pulley wheel mounted within the frame in alignment with the generator, means drivingly connecting said first pulley wheel to the generator, a second pulley wheel mounted within the frame and having a driving shaft extending from the frame side opposite that which the generator is mounted on, said first and second pulley wheels drivingly interconnected, and pickup means mounted on the upright legs of said triangular frame whereby lift arms of a vehicle may be connected to the assembly for lifting of the assembly for transporting as well as to position said driving shaft proximate a power takeoff means for driving connection therewith to operate the generator.

2. A portable welding and electric power generating assembly comprising: a triangular frame, a blower housing mounted to extend axially from one side of said frame and having a blower therein, a generator mounted to and extending axially from said housing, a first pulley wheel mounted within the frame in alignment with the blower and generator, means drivingly connecting said first pulley wheel to the blower and generator, a second pulley wheel mounted within the frame and having a driving shaft extending from the frame side opposite that which the generator is mounted on, a universal joint connector on the end of said shaft, said first and second pulley wheels drivingly interconnected, and pickup means mounted on the upright legs of said triangular frame whereby lift arms of a vehicle may be connected to the assembly for lifting of the assembly for transporting as well as to position said driving shaft proximate a power takeoff means for driving connection therewith through the universal joint to operate the generator.

3. A portable welding and electric power generating assembly as claimed in claim 1 wherein the pickup means comprise a pin extending laterally from each upright leg of the frame on the same vertical side the generator is mounted on.

4. A portable welding and electric power generating assembly as claimed in claim 3 including a stabilizer bar mounted on the opposite vertical side of the frame at a height substantially the same as said pins, a cutout in the upper edge of the stabilizer bar at each side between the upright frame legs and ends of said bar whereby when the lift arms are mounted on the pins and the assembly lifted, the lift arms will become positioned in the cutouts thereby stabilizing the assembly.

5. A portable welding and electric power generating assembly as claimed in claim 4 wherein the stablizing bar is vertically adjustable.

6. A portable welding and electric power generating assembly comprising: a triangular frame, a generator mounted to extend axially from one side of said frame, a first pulley wheel mounted within the frame in alignment with the generator, means drivingly connecting said first pulley wheel to the generator, a second pulley wheel mounted within the frame and having a driving shaft extending from the frame side opposite that which the generator is mounted on, said first and second pulley wheels drivingly interconnected, electrical control means mounted on the assembly to provide control of the electric power output of the generator when driven, and pickup means mounted on the upright legs of said triangular frame whereby lift arms of a vehicle may be connected to the assembly for lifting of the assembly for transporting as well as to position said driving shaft proximate a power takeoff means for driving connection therewith to operate the generator.

7. A portable welding and electric power generating assembly comprising: a triangular frame having a horizontal base leg and an upright leg extending upward at an angle from each end of the base leg and joined together at their other ends, a blower housing mounted to the upper corner of one side of said frame, a blower means within said housing, a generator mounted coaxially to said housing, a first shaft mounted in the upper corner of the frame to extend from the sides thereof, said first shaft mounted coaxially to said blower and generator and drivingly connected thereto, a first pulley wheel mounted on said first shaft within the frame, a support member connected on each side of the triangular frame parallel to the base leg and intermediate the base leg and upper corner of the frame, each support member having an opening intermediate its ends, a second shaft mounted in said support member openings and extending from the frame side opposite that to which the blower and generator are mounted to, a second pulley wheel mounted on said second shaft within the frame, belt means drivingly interconnecting said first and second pulley wheels, and pickup means mounted on the upright legs of said frame whereby lift arms of a vehicle may be connected to the assembly for lifting of the assembly for transporting as well as to position said second shaft proximate a power takeoff means for driving connection therewith to operate the generator.

8. A portable welding and electric power generating assembly as claimed in claim 7 wherein the connection of the support members to the sides of the triangular frame is vertically adjustable whereby the second shaft may be positionally moved relative to the first shaft to adjust the tightness of said belt means.

No references cited.